United States Patent [19]
Davis

[11] 3,739,379
[45] June 12, 1973

[54] COHERENT PULSE DOPPLER ALTIMETER

[75] Inventor: Donovan C. Davis, Pasadena, Calif.

[73] Assignee: Hoffman Electronics Corporation, El Monte, Calif.

[22] Filed: Feb. 3, 1971

[21] Appl. No.: 112,295

[52] U.S. Cl. .................................. 343/7.3, 343/7.5
[51] Int. Cl. ........................... G01s 9/10, G01s 9/16
[58] Field of Search ............................. 343/7.3, 7.5

[56] References Cited
UNITED STATES PATENTS

| | | | |
|---|---|---|---|
| 2,946,050 | 7/1960 | Wathen | 343/7.5 X |
| 3,344,421 | 9/1967 | Dildy, Jr. | 343/7.3 |
| 3,147,476 | 9/1964 | Stodola | 343/7.5 X |
| 3,469,261 | 9/1969 | Lambert, Jr. et al. | 343/7.5 |
| 3,631,487 | 12/1971 | Huntsinger | 343/7.3 |
| 2,869,119 | 1/1959 | Fredrick | 343/7.5 |

Primary Examiner—Malcolm F. Hubler
Attorney—Lyon & Lyon

[57] ABSTRACT

A coherent pulse doppler altimeter system employing a single antenna wherein the transmit signal is a generated series of pulses the pulse width and repetition frequency of which are varied keeping the average power high although peak transmitter power can be low enough to permit utilization of all solid state components. The ground return pulse will have a doppler shift caused by the vertical component of the aircraft velocity and a doppler spread due to the horizontal velocity. The receiver is tuned to receive the first side band of the return signal. The receiver is range gated by a gate pulse which is varied as the pulse repetition frequency (PRF) is varied so that just the leading edge of a return pulse passes through the gate. Variations in PRF are controlled by the tracking of that leading edge by the range gate. The PRF is then counted to give altitude.

12 Claims, 2 Drawing Figures

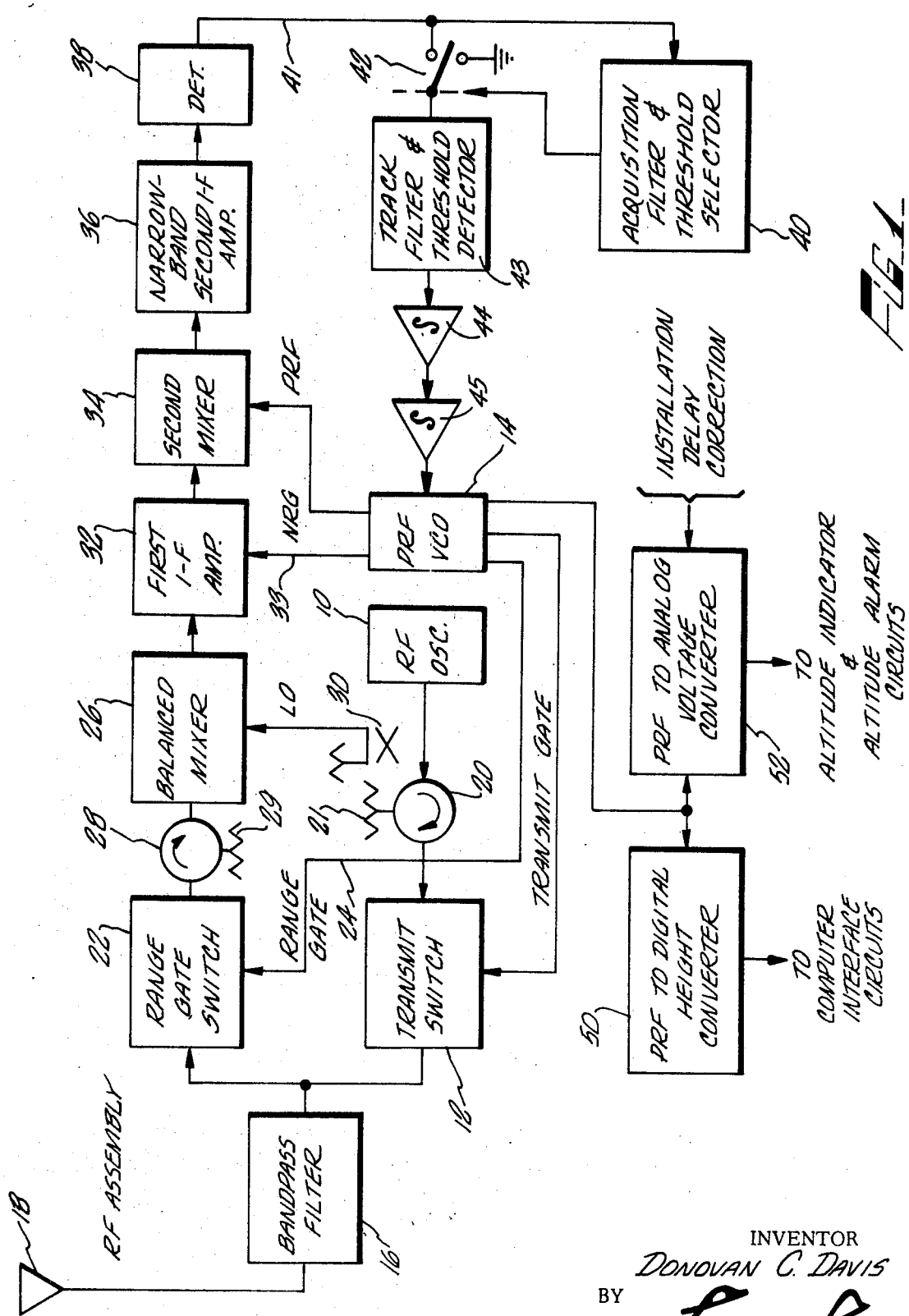

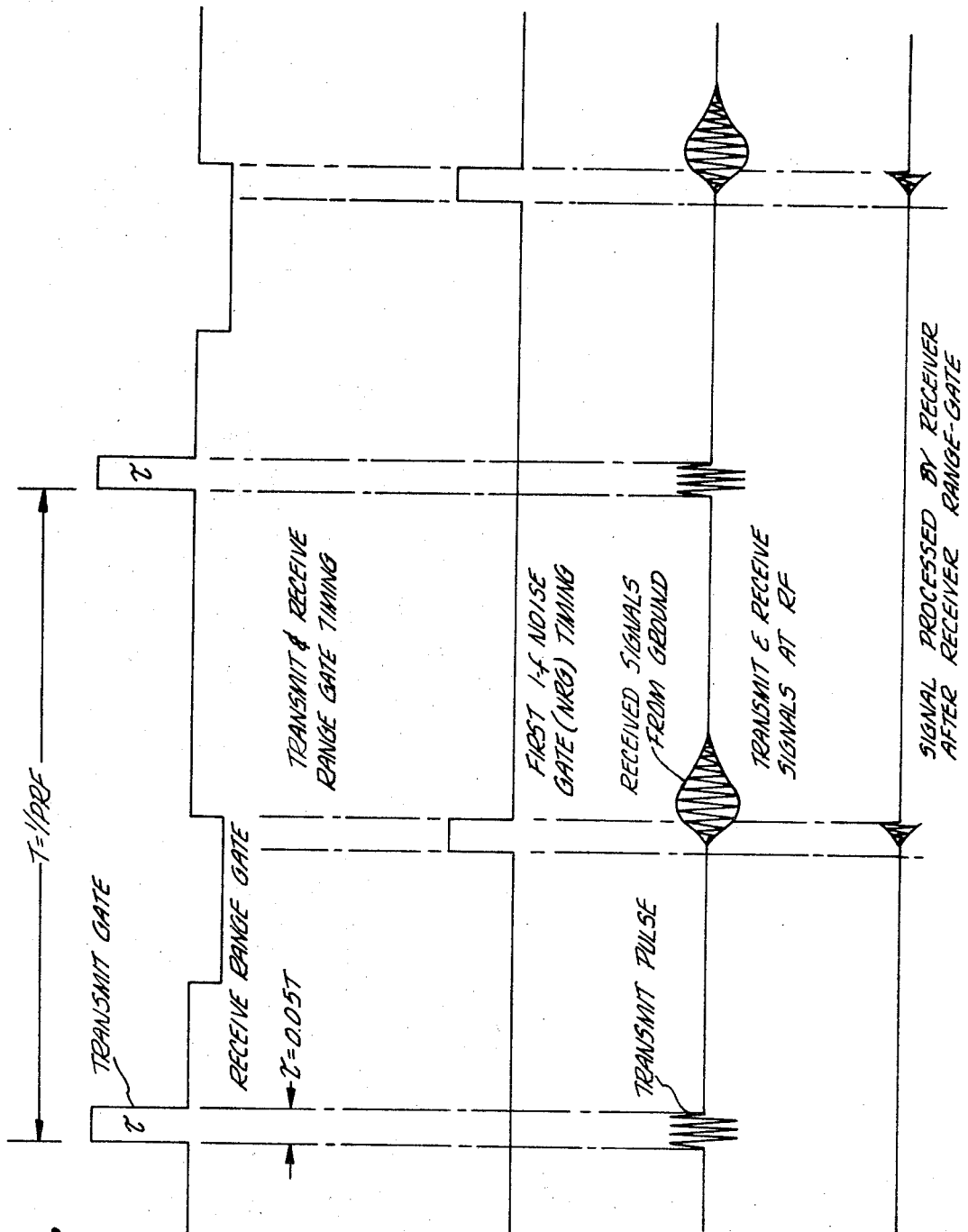

COHERENT PULSE DOPPLER ALTIMETER

BACKGROUND OF THE INVENTION

Of radar altimeter systems presently in use, there are two basic types, fm/cw and a pulse system. The fm/cw system transmits a signal the frequency of which varies in a sawtooth fashion with respect to time and the transmitted signal is continuous. Such a system requires separate transmit and receive antennas and the antennas must be so located on the aircraft that the receive antenna will not pick up directly from the transmitting antenna. Thus, one of the drawbacks of the fm/cw system is first of all the requirement for two antennas and secondly the careful placement of those antennas on the aircraft. It is also possible for the fm/cw system to provide an altitude error. This results from the fact that the system is sensitive to changes in terrain. A change in terrain gives a band of delta f frequencies to which the receiver is responsive resulting in an indication of average height of the terrain over the illumination area rather than just reading the top surface of the terrain. This is particularly true where the aircraft is flying over a wooded area or over a very dry snowpack. In both instances, some of the transmitted signal will be reflected from the top of the terrain and some will travel through to the ground. The resultant indicated altitude is an average between the altitude of the ground and the top of the snow or trees.

Another difficulty with the fm/cw system is that it is susceptible to a double bounce error at low altitudes. If the aircraft is flying over a relatively smooth surface such as water on or approach to landing, and below about 50 feet, the areas of illumination for the two antennas or at least the areas of illumination in which the antenna gain remains high, may not overlap and a strong signal may be reflected from the ground to the fuselage of the craft back to the ground and back again to the receiving antenna along a transmission path which is about twice the actual height above the ground.

In the pulse system, the transmitter transmits a relatively high-power output pulse at a fixed frequency. Because the average power will determine the sensitivity of the system, it is necessary in the pulse system to have either wide pulses or high amplitude ones, i.e., around 100 watts or more. If wide pulses are used rather than ones of high amplitude, the receive pulse at low altitudes will return to the aircraft before the end of the transmit pulse. It is required that the system measure from the aircraft to the ground with the aircraft's wheels sitting on the ground and when you take into account the installation and cable delay plus the height above the ground, this provides an initial altitude which must be corrected for of about 10 feet in terms of delay time, the speed of propagation being approximately one foot per nano-second. If the altimeter is to read a maximum altitude of 5,000 feet, round trip transmission time is approximately 20 microseconds with a fixed pulse-rate frequency. What conventional pulse systems use is a high transmitter power, usually about 100 watts, so that they can narrow the pulse somewhat but it still requires two antennas with the same problems of isolation as are present with the fm/cw system. Again, the two antennas have the double bounce problem.

Due to the high power used, pulse systems have a tendancy to give a false lock error because of reflections off of anything depending from the airplane such as landing gear, flaps or external stores. One of the problems which occur with the pulse system is that after the antennas are located on the body of the aircraft to eliminate false lock reflection problems, the antenna may see additional reflections if additional bombs or missiles are hung from the airplane or after they are jettisoned so it is difficult to maintain accuracy. The receiver in the pulse system must have a wide band width to assure high accuracy and this will mean that noise will be more of a problem, particularly at higher altitudes. The pulse system does give a good height reading in that it measures altitude to the closest point and does not have the average height reading present with he fm/cw system.

SUMMARY OF THE INVENTION

The present system is a coherent pulse doppler system. In this only one antenna is used so that the double bounce problems are at once eliminated. Transmitter power is low but to maintain sensitivity, the average power is kept high by varying the pulse repetition frequency and transmitting pulses more frequently. The pulse width of the transmitted pulses is varied and is narrowed when the craft is close to the ground. A ratio is maintained of $T=20t$ where $T$ equals the time between successive transmitter pulses and $t$ equals the pulse width. It should be recalled that in the old pulse system they do not change the inter-pulse period. In the present system the average power equals 0.05 the peak power whereas in the pulse system average power equals 0.001 times the peak power. Thus, if you compare the 100 watts used in the pulse system the peak power can be one-fiftieth of that or as little as 2 watts. Other factors permit further reduction of peak power down to as little as 50 mw.

If the horizontal velocity, that is the relative horizontal velocity between the aircraft and the ground is increasing, the receiver will see a return signal with a frequency shifted to a lower frequency. The amount of frequency shift in the system is equal to 8.6 Hz. per foot per second which gives at a velocity of 600 feet per second a doppler frequency shift of 5.16 KHz.

The effect of false lock is eliminated because landing gear, flaps and external stores can have no effect upon the signal because they are stationary and there will be no doppler shift. The system employs pre-detection filtering or a very narrow band width filter ahead of the detector which again increases the sensitivity of the system approximately 10 db. This allows a reduction in transmitter power from 2 watts to 50 milli-watts.

At the transmitter frequency, the doppler shift caused by a change in horizontal velocity will be proportionate to the width of the received pulse. If there is a change in vertical velocity, the location of the pulse will be shifted away from the transmitter frequency to the right or left.

The pulse rate frequency (PRF) of the system is determined when the range gate locks into the received pulse and this pulse rate frequency provides an altitude reading by digitally counting that frequency or providing an analog output. The range gate pulse is timed to occur half way in time between successive transmitter pulses when the transmitter pulses are in the search mode which is to provide a frequency sufficient to receive a return at or below 5,000 feet.

Variable width pulses are provided to the transmitter by first having a constant rf oscillator the output of which goes to a solid state switch which is controlled by a modulator pulse and has a high degree of attenuation of approximately 80 db. By this method, the pulse rate frequency can be varied over a ratio of 500 to 1 which gives a frequency from 50 Hz. to 25 MHz. At the low transmitter frequency, even down to 100 Hz., there is a problem of very bad noise because of the characteristic noise problems of the switch so the solution is to look for the second shift or first side band. Thus the first i-f filter is rather wide band, eliminates the first doppler shift and permits the rest of the receiver to see the shift occurring at about 50 KHz. The first i-f pass band is 40 KHz. to 25 MHz. The output of the first i-f goes to the second mixer which uses the pulse rate frequency as a local oscillator. The second i-f is narrow band between 100 Hz. and 20 KHz. so that the output is just the first side band.

The system employs leading edge tracking. The received pulse reaches 90 per cent of its maximum in the first 0.1 $t$ wherein it reaches its maximum at 1.0 $t$. The range gate operates to let in the received pulse only up to where it reaches 90 per cent or 0.1 $t$ and $t$ equals 0.1 times the altitude so that by allowing the range gate to let in just this much of the receive pulse, there is introduced 1 per cent error in altitude.

It is a principal object of the present invention to provide a radar altimeter utilizing a single antenna.

It is also an object of this invention to provide a radar altimeter which is tuned to receive a doppler shifted ground return signal so that return signals from fixed objects will have no effect.

It is a further object of the present invention to provide a radar altimeter which can be operated at very low peak transmitter power permitting use of all solid state components for greater reliability and longer life.

It is an additional object of this invention to provide a radar altimeter employing precise tracking of the leading edge of the return pulse to give a very low altitude reporting error.

It is a still further object of this invention to provide an altimeter in which the altitude reporting error is further decreased below 500 feet AGL.

It is a specific object of this invention to provide a radar altimeter wherein the pulse width and pulse repetition frequency are varied to maintain the accuracy and sensitivity of the system down to ranges as close as 10 feet while using a single antenna.

Further objects and advantages will become readily apparent upon reading the ensuing detailed description.

DESCRIPTION OF THE DRAWINGS

FIG. 1 consists of a block diagram of the altimeter system.

FIG. 2 is a set of waveforms showing the relative timing between transmit and receive pulses.

DESCRIPTION OF THE INVENTION

An rf oscillator 10 provides a continuous output signal at an assigned frequency of 4.3 GHz. and an approximate power level of 100 mw. The type of oscillator employed may be a conventional transistor oscillator and the major considerations of this oscillator are that it have the required power at the designated operating frequency, that it have at least a good short-term frequency stability and that the noise spectrum be acceptably low at the frequencies to which the altimeter receiver is tuned. It is contemplated that this rf source would utilize either a fundamental transistor oscillator operating at 4.3 GHz. or a sub-harmonic oscillator coupled with a varactor multiplier having a multiplication factor of either two or three, either approach providing approximately the same overall efficiency at the required power level.

The output of rf oscillator 10 goes to a transmit switch 12 which gates the rf signal by a pulse generated from a voltage-controlled oscillator 14. In this manner, the output of the transmit switch is controlled by the transmit gate pulse to provide a variation in the transmitter output pulse both in pulse width and pulse repetition frequency (PRF). As will be seen, this means of variation is an important factor in the operating of the altimeter inasmuch as the variation in pulse width permits the efficient and accurate operation of the altimeter with a single antenna system down to very close ranges. The system employs a fixed ratio of pulse width to inter-pulse period. Depending upon the height of the aircraft above the ground, the transmitted pulse width is varied from 5 nano-seconds at a minimum of 10 feet, which includes installation and cable delay as well as the initial height of the altimeter antenna above ground with the aircraft sitting on the ground; up to a pulse width of one microsecond at the maximum tracking height of 5,000 feet. This corresponds to a duty cycle of 0.05 at 5,000 feet. Actually, below 25 feet the pulse width is maintained constant and the duty cycle increased slightly. Thus, the transmit switch 12 is required to provide a variation in pulse width of 500 to 1 and must be able to produce pulses as narrow as 5 nano-seconds and as wide as 1 micro-second and it is further required that it have a minimum rise and fall time of 2 nano-seconds. The insertion loss in the ON position should be small and isolation in the OFF position should be at least 70 db. It has been found that two high-speed PIN diodes can be used as the transmit switch 12 to meet these basic requirements. The output of transmit switch 12 is fed through a branch line duplexer (not shown) to bandpass filter 16 having a pass band of 4.2 to 4.4 GHz. The purpose of filter 16 is simply to prevent signal radiation outside the permissible band allocated for radar altimeter use. The output of said filter 16 is of course connected to antenna 18.

Since the transmit switch 12 which gates the output of oscillator 10 is essentially a reflection-type switch it is necessary that the oscillator be isolated from the switch to prevent pulling of the oscillator by the change in load VSWR presented by the switch from the OFF to the ON condition. Accordingly, an isolator 20 is interposed between the oscillator 10 and the switch 12. By also adjusting the line length between the oscillator and the switch, the variation in load as seen by the oscillator can be made to have a negligible effect upon the operation of the oscillator. Isolator 20 may be a conventional three-port circulator with the third port connected to a dummy load 21.

The ground return signal is sensed by the same antenna 18, passed through filter 16, and coupled through another branch line duplexer (not shown) to range gate switch 22. Range gate switch 22 is similar to transmit switch 12 in that a PIN diode switch is employed. The range gate switch is actuated by a range gate signal which appears on line 24 coming from the voltage-controlled oscillator 14. The range gate pulse has a trailing edge half way between the leading edge of the transmit pulses. The duty cycle of the transmit pulses is 1 to 20 whereas the duty cycle of the range gate pulses is 1 to 4. In this condition the receiver is set at its maximum altitude range. If no ground return pulse is sensed by the receiver having a signal strength above a pre-set threshold, the VCO 14 is scanned varying the PRF and the pulse width on the transmit signal, causing the interpulse period between transmit pulses and range gate pulses to decrease, so that the system scans from maximum altitude toward minimum altitude. As will be explained more completely subsequently, the system will continue to scan from maximum altitude to minimum, re-set and scan again until a ground return is detected. When a ground return with a magnitude above the acquisition threshold is encountered, the system locks and the scan or sweep generator is disabled and a track loop operates to control the PRF oscillator as long as the received signal strength is adequate. In the track mode, the PRF is controlled so as to position the range gate to allow just the leading edge of the ground return pulse to pass through the receiver so that the detected receiver output will be equal to the track threshold.

As previously mentioned, the range gate switch 22 is a PIN diode switch and the output of this switch is fed to a balanced mixer 26 through an isolator 28 which is similar to isolator 20 in that it is a three port circulator with the third terminal connected to a dummy load 29. A signal is obtained through a directional coupler 30 from the transmitter signal output from oscillator 10 and is applied to the balanced mixer 26 as the local oscillator 10 making this a homodyne or zero i-f frequency system.

The output of mixer 26 is fed to the first i-f amplifier 32 which is designed to have a bandpass of 40 KHZ. to 25 MHz. By fixing the lower end of the bandpass of 40 KHz., the receiver will pass the first sideband of the transmitted pulse rather than the carrier frequency as is usually done in conventional homodyne receivers. The bandpass of the first i-f will permit the passage of higher signal spectrum components but these will be rejected by the narrow band second i-f amplifier. The first sideband of the signal occurs at about 50 KHz. so setting the lower end of the bandpass at 40 KHz. provides for the expected range of doppler frequency shift. The use of this bandpass provides a good receiver noise figure, however 1/f mixer noise is still a factor. To further increase the sensitivity or decrease the noise level, noise range gating is utilized. To accomplish this, a signal is derived from the PRF/VCO 14 on line 33 and used as a gate signal to essentially turn off the first i-f amplifier except at the time when it is known that a ground return signal could come through. This is accomplished by deriving the NRG signal with a fixed relationship to the range gate signal appearing on line 24 so that a gate pulse appearing on line 33 has a duration which persists during the last 20 per cent of the range-gate pulse. In this manner, noise passing through the receiver is essentially shut off except for a period of time slightly ahead of and during the passage of a ground return signal. The NRG pulse is operative from a maximum range of 5,000 feet down to 500 feet at which point the PRF has increased to a point where the transmit pulses have become quite narrow and it is difficult to accurately fix the NRG pulses to the last 20 per cent of the range gate pulses and in any case at such lower altitudes, the ground return signal is sufficiently strong and of such short duration that noise is not a serious problem. Thus, when the PRF reaches the higher rate indicative of about 500 feet, the NRG pulses are disabled leaving the gate open in the first i-f amplifier 32.

The output of the first i-f is fed to a second mixer 34. The second mixer uses as a local oscillator the pulse repetition frequency derived from the PRF/VCO 14 thus converting the first sideband of the return signal to zero i-f frequency. The output of the second mixer is fed to the second i-f amplifier 36 which has a narrow pass band. This second i-f 36 has a pass band which covers the range of doppler frequencies which can result from zero to maximum horizontal and vertical velocities. Since the system tracks the doppler modulation about the first PRF line of the transmitted signal spectrum, it must have a first i-f pass band which encompasses those frequencies lying between the lowest PRF of 50 KHz. and the highest of 25 MHz. The highest PRF occurs at a minimum altitude which is about 10 feet if you include installation delay, etc., and the minimum PRF occurs at the maximum altitude of 5,000 feet. Many PRF lines will fall within the first i-f pass band of 40 KHz. to 25 MHz. The second i-f pass band effectively extends from 100 Hz. to KHz. on both sides of the PRF line and this will effectively filter out all other PRF lines so that only the desired response of plus or minus 100 Hz. to plug or minus 20 KHz. is ultimately detected by the receiver.

One of the significant performance improvements provided by the present altimeter system is its ability to discriminate against reflections occurring from aircraft appendages, such as flaps, landing gear and external stores. The return signal from the ground contains both a doppler frequency spread and a doppler frequency shift due to the the horizontal and vertical components of aircraft movement respectively. Returns from aircraft appendages will not contain doppler components and consequently the present system is capable of rejecting signals from fixed returns which might otherwise give erroneous height measurements at low altitudes. This is accomplished by establishing the bandpass of the second i-f 36 at the minimum of 100 Hz. In order for the low end of this bandpass to discriminate against a ground return signal the aircraft would have to have less than three feet per second vertical or horizontal velocity. The PRF line of the received signal is shifted in frequency by the amount of doppler shift arising from the vertical velocity of the aircraft and the signal has a spread width caused by the horizontal component of its velocity and so the received signal will never lie at the same frequency as the PRF line nor have a width narrow enough to be rejected by the second i-f unless both velocity components are less than 3 feet per second. The upper limit of the second i-f amplifier of 20 KHz. has been determined to cover the maximum possible doppler shift due to a vertical rate of plus or minus 2,000 feet per second, which would give a doppler shift of 17.2 KHz. or a spectrum width due to a horizontal velocity of 2,000 knots which would give a signal spectrum width of plus or minus 12.2 KHz.

The second i-f 36 also includes an automatic noise leveling system to maintain receiver noise at a constant level independent of the effects of component aging, temperature or other factors. This is accomplished by interrupting the transmit pulses every 1.0 seconds for a period of 100 milli-seconds and sampling the noise level during that period of time. The noise voltage level is then compared to a reference and the gain of the second i-f amplifier 36 adjusted so that he noise level voltage corresponds to the reference level. Another method of automatic noise leveling employs the use of a 5 KHz. pass band above the expected range of doppler frequencies. By bandpass filtering the output from the second i-f amplifier 36, a gain control signal can be obtained developing a dc feedback to control the gain of the second i-f amplifier.

The output of the second i-f amplifier is envelope detected by detector 38 and the output thereof is fed initially to an acquisition filter and threshold selector 40. A post-detection low pass filter is set at 650 Hz. The output from that filter will be a combination of signal and noise and that signal is differenced with another signal which represents noise only, such a voltage level being the reference for the ANL circuit previously described. The resulting signal appearing on line 41 goes to the acquisition filter and threshold selector 40. The signal is applied to a low-pass acquisition filter of 40 Hz in bandwidth. The output of that filter is then compared to the acquisition threshold voltage by means of a difference amplifier. With appropriate logic circuitry, the output of the difference amplifier controls solid state switch 42. While in the search mode, switch 42 is coupled to ground whereupon the PRF/VCO scans from a maximum to minimum altitude, as previously described, by gradually increasing the PRF until such time as a return signal does pass through the receiver and exceeds the minimum threshold level whereupon switch 42 is actuated.

When switch 42 is actuated, the track loop is established and the system is then operating in its track mode. In this mode, the effect of the scan generator is by-passed so that the PRF does not continue to scan from maximum to minimum altitude. On the other hand, the PRF is controlled by the track loop as long as a signal is being passed through the receiver having a level above the track threshold value as determined in a manner well known in the art in the track filter and threshold detector 43. After the track loop takes over, it exercises further control through integrators 44 and 45 over the PRF so that at most only the first ten per cent of the leading edge of the ground return pulse is passed by the range gate. This maintains the altitude indicating error at about one per cent of actual altitude at maximum altitude. Below 500 feet, the voltage level of the ground return pulse will be much greater and, as previously mentioned, the noise range gate is disabled and because of the higher voltage level of the ground return signal, tracking of that pulse can be done with a smaller percentage of the total pulse in the range while still obtaining a sufficient voltage level to pass the required threshold value with the result that the error decreases below 500 feet.

With the track loop thus controlling the PRF, as it follows the ground-return pulse, the PRF is used to indicate altitude. The PRF is fed to either a digital converter 50 or to an analog convertor 52. The digital convertor then supplied digital height information to be supplied to a general purpose computer whereas the analog convertor supplies analog altitude information to be used to drive an altitude indicator for cockpit use and also to be supplied to comparators to be used in an altitude-warning system.

I claim:

1. A coherent pulse doppler altimeter system, comprising:
   transmitter means for transmitting a series of pulses at a predetermined pulse repetition frequency;
   receiver means for receiving transmitted pulses after said pulses have been reflected, said receiver means having detecting means for detecting only signals from said antenna reflected from surfaces having a relative velocity with respect to said transmitter, said receiver means including a first and second mixer, said first mixer including a first local oscillator and said second mixer including a second local oscillator at a frequency of the pulse repetition frequency of the transmitter means, the output of said first mixer being electrically coupled to the input of said second mixer and the input of said first mixer being adapted to receive the signals detected by said detecting means; and
   a single antenna coupled to said receiver means and said transmitter means.

2. A system as in claim 1 including a voltage-controlled-oscillator means electrically coupled to said transmitter means for varying the pulse repetition frequency and pulse width of the transmitted pulses.

3. A system of the type described in claim 1 wherein said receiver means includes gate means electrically coupled between said antenna and said input of said first mixer for passing only the leading edge of the received transmitted pulses.

4. A system as in claim 3 wherein the gate means is terminated at a fixed fraction of the inter-pulse interval.

5. A system as in claim 4 wherein the fixed fraction is equal to one-half of the inter-pulse interval.

6. A coherent pulse doppler altimeter system comprising:
   a single antenna;
   transmitter means coupled to said antenna for transmitting a series of pulses;
   voltage-controlled-oscillator means coupled to said transmitter means for varying the repetition frequency and width of said pulses; and
   receiver means coupled to said antenna for receiving said pulses after they have been reflected from a remote surface, said receiver means having detecting means operative to only permit the passage of pulses from said antenna reflected from surfaces which have a relative velocity with respect to said antenna, range gate means coupled to said voltage-controlled-oscillator means for passing said reflected pulses from said antenna, said range gate means being operative to only pass the leading edge of said reflected pulses occurring within a time indicative of a maximum preselected range, said receiver means including a first and second mixer, said first mixer including a first local oscillator and said second mixer including a second local oscillator at a frequency of the pulse repetition frequency of the transmitter means, the output of said first mixer being electrically coupled to the input of said second mixer and the input of said first mixer being adapted to receive the signals detected by said detecting means.

7. An altimeter system set forth in claim 6 wherein said transmitter means comprises an rf oscillator means having an rf frequency said rf oscillator being at the frequency of said first local oscillator, switch means coupled to the output of said rf oscillator means, the aforesaid voltage-controlled-oscillator means being coupled to said switch means to actuate said switch means to provide said transmitted pulses having a variable repetition frequency and pulse width.

8. The system set forth in claim 7 wherein an isolator is interposed between said rf oscillator means and said switch means.

9. The system set forth in claim 7 wherein said receiving means includes track detector means coupled to said voltage-controlled-oscillator means for varying the pulse repetition frequency and pulse width thereof when t he output of said second mixer is above a predetermined value.

10. The system set forth in claim 3 wherein said receiving means further includes threshold detecting means coupled to said track detect or means, said threshold detecting means being responsive to reflected pulses passed by said receiving means at the output of said second mixer, said threshold detecting means allowing said track detecting means and said voltage-controlled-oscillator means to vary the pulse repetition frequency and the pulse width thereof.

11. The system set forth in claim 6 wherein said receiver means further comprises:
a first i-f amplifier coupled to said output of said first mixer, said first i-f amplifier having a pass band which passes at least the first sideband of said rf frequency and which does not pass signals at said frequency, said input of said second mixer coupled to said first i-f amplifier;
a second i-f amplifier coupled to said output of said second mixer, said second mixer having a pass band the lower frequency limit of which is greater than zero and and the upper frequency limit of which is somewhat greater than t e maximum expected doppler frequency shift;
and second detector means for detecting the output of said second i-f amplifier coupled to the output of said second i-f amplifier.

12. The system set forth in claim 11 wherein said voltage-controlled-oscillator is electrically connected to a noise input of said i-f amplifier said noise input being operative to permit passage of pulses through said first i-f amplifier during only a portion of the time when said range gate means is operative to pass reflected pulses.

* * * * *